Aug. 1, 1967   M. A. SUSEMIHL   3,333,397
SEALING DEVICE

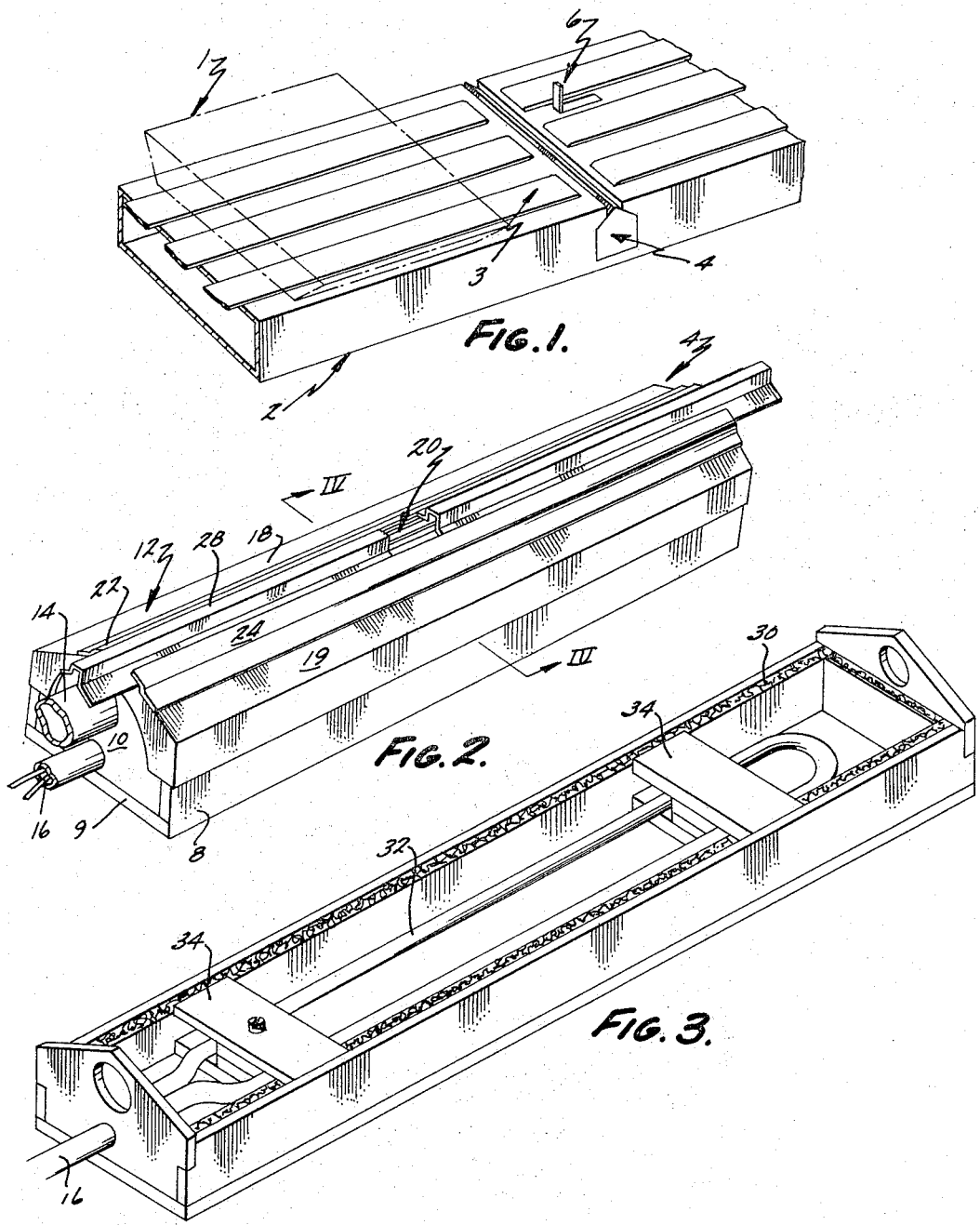

Filed Aug. 17, 1964   2 Sheets-Sheet 2

INVENTOR.
MELVIN A. SUSEMIHL
BY
ATTORNEYS

United States Patent Office 3,333,397
Patented Aug. 1, 1967

3,333,397
SEALING DEVICE
Melvin A. Susemihl, San Jose, Calif., assignor to Oliver Machinery Company, Grand Rapids, Mich., a corporation of Michigan
Filed Aug. 17, 1964, Ser. No. 389,896
7 Claims. (Cl. 53—388)

This invention relates to the sealing of packages, and more particularly to a method and a device for sealing packages wrapped in fusible films.

With the advent of plastic substances such as polyethylene, polypropylene, polystyrene, the polyvinyls, and other like substances which are well adapted to be used in the form of thin flexible films, new packaging techniques became feasible using these films as an encasement or envelope. Such packaging is highly desired, since the plastic films are, in general, very effective air and moisture barriers. Thus, they can effectively contain such perishable commodities as baked goods and other foodstuffs, fresh flowers, and many other similar commercial items for periods of time far exceeding those obtainable with previous methods. Furthermore, goods packaged in this manner remain in a fresher and more appealing state regardless of how long they are stored. Moreover, the plastic films accomplish these results while providing positive assistance in merchandising the goods, since the films are transparent and therefore, allow the goods to be appealingly displayed to the eye of the consumer.

In order to seal a package wrapped in such films, however, the overlapping edges of the wrapping must normally be pressed tightly together and heater to a fusing temperature while so pressed. Since one of the principal advantages in using such films is to obtain a package that is impervious to the passage of air and moisture, it is most important that the wrapping be completely sealed. Therefore, previous methods of sealing, such as spot adhesion for example, could no longer be relied upon and became outdated.

One of the newer methods developed to seal such packages incolves a heated bar which forces the films of the wrapping together while heating them sufficiently to fuse or partially fuse the various layers, thereby creating a complete and continuous seal. In many cases, however, this method cannot be used, since the goods are fragile and will not allow pressure to be brought to bear against them on the side opposite the sealing bar, since in so doing, the fragile goods would be crushed. Moreover, very often the containers or trays in which such goods are placed for wrapping have irregularly dimpled and uneven bottoms which simply do not permit an effective seal to be made by a sealing bar, even if some way should be discovered for pressing the bar against the goods in the package without crushing them.

The present invention achieves its most important objective by overcoming these and other problems, through the provision of a method and a device by which packages wrapped in such materials may be sealed perfectly, without regard to the fragility of the contents of the package or to the lack of regularity of its bottom surface.

Another important object of this invention is that it is well adapted for integration into the automated systems of conveyorized mechanisms which form a part of modern manufacturing and packaging techiques.

Still another important objective of this invention is the elimination of so-called "drag failures," i.e. defective seals which occur when the heated bar method is used as a result of the tendency of the plastic films to adhere to the hot bar, causing the rupture of the seal as the package is removed from the bar.

Still another important advantage of the present invention is that the device is quite economical to produce, and requires very little or no upkeep, since all parts which move or are otherwise subject to extensive wear or deterioration have essentially been eliminated.

These and other additional objects and advantages of this invention will become increasingly clear upon perusal of the following specification and its appended claims, taken in conjunction with the accompanying drawings which show a preferred embodiment of this invention.

In the drawings:

FIG. 1 is a fragmentary perspective view showing the sealing device in its working environment;

FIG. 2 is an enlarged perspective view of the sealing device alone;

FIG. 3 is the perspective view of FIG. 2, the cover portion thereof having been removed to show its interior;

Figure 4:
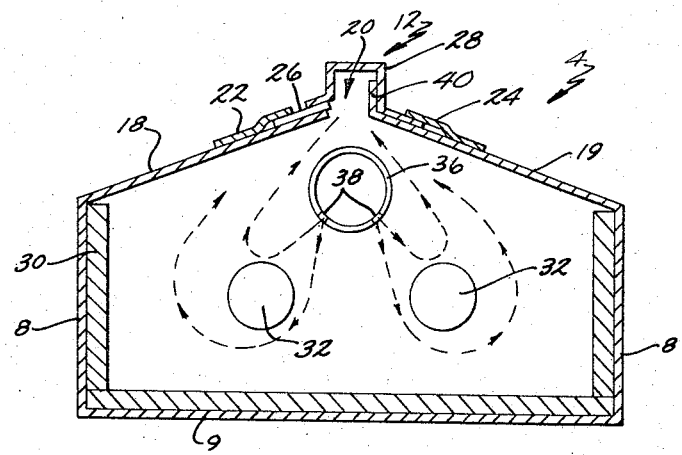
FIG. 4 is a central section of the sealing device, taken through the plane IV—IV of FIG. 2.

Stated in brief, this invention concerns the sealing of packages wrapped in thin plastic films which by their nature are fusible under heat and pressure. In accordance with this invention, sealing is accomplished by directing a jet of hot, pressurized fluid such as air against the fusible wrapping at the point where its edges are overlapped, as on the bottom of the package being sealed. The jet of fluid simultaneously forces the overlapping layers of wrapping tightly against each other, and fuses them together in this position, thereby swiftly and effortlessly creating a complete seal. This seal is impervious to the passage of both aid and moisture.

The preferred method of providing the blast of hot, pressurized air or other fluid is to provide a chamber with an outlet opening which can be adjusted to accommodate various seal configurations, and to provide heater elements within the chamber which are maintained at a predetermined temperature. Under these conditions, if a supply of compressed air is introduced into the chamber, and if jets of this air are released, the released air will be instantly heated and will exhaust from the chamber through the discharge opening as from a nozzle. Thus, if the nozzle is directed at the overlapped layers of fusible wrapping material in the manner previously indicated, the overlapped layers will be forced tightly together and securely fused while in this position, and the desired seal will be effected. This is true regardless of how fragile and crushable the material being packaged may be, since no pressure need be brought to bear against the side of the package opposite the air jet, and regardless of how irregular the bottom of the package may be against which the wrapping is pressed, since the jet will mold the layers of wrapping material against a surface of almost any configuration. Consequently, the term "generally rigid" as used herein with respect to such a surface is not intended to mean a surface which is unyieldable or truly rigid, but only a surface which offers at least a minimal amount of resistance to a deforming influence such as the air jet just noted.

Referring now in more detail to the drawings, in FIG. 1 a package 1, which may be a relatively shallow open tray, is seen after the same has been wrapped with fusible plastic wrapping material. The package as so wrapped is moved along a conveyor mechanism 2 by suitable means such as the endless moving belts 3. The sealing device 4 of this invention has been installed in the bed of the conveyor 2 in a transverse position. The tray 1 will be moved by the conveyor directly across the top of the sealing device. Sensing means such as 6 may be included in the conveyor bed, in a position where the same will be actuated by the moving package 1. The sensing means 6 actuates the sealing device 4 in response to contact by the package at the precise moment when the package 1 is properly positioned above the sealing device.

The mechanism for wrapping the film about the package is neither illustrated nor described since it may be any one of many well-known wrapping machines. In the particular environment shown, it is important, however, that the package, as it is moved over the sealing device 4, be so positioned that the overlapped edges which are to be sealed be positioned on the bottom of the package and the joint to be sealed be oriented transversely of the conveyor so as to correspond to the position of the sealing device.

The exterior physical configuration of the sealing device 4 is shown in FIG. 2, where it will be seen that the device comprises in part an essentially closed compartment having opposing longitudinal sides 8, a bottom 9, opposing ends 10, and a top structure 12. In addition, one of the opposed ends 10 includes an inlet 14 for pressurized fluid such as compressed air, and an input 16 for heat or heat-producing power such as electricity.

The top structure or cover 12, as seen in both FIGS. 2 and 4, includes a pair of flat surface members 18 and 19 which attach to the opposing sides 8 and to the opposing ends 10 in a manner whereby the surface members 18 and 19 form an inverted V-shaped cover closing the top of the device. This cover only partially closes the device, however, since the central apex portion thereof remains open and forms an elongated, slit-like discharge aperture or orifice 20. The surface member 19 has an upstanding lip 40 forming one side of the orifice 20.

A pair of retaining guides 22 and 24 are attached to the cover, one to each of the surface members 18 and 19 near the upper ends thereof, adjacent the discharge aperture 20. The guides 22 and 24 are long strips of sheet material with a longitudinal offset portion lying parallel to and just above the surface members 18 and 19 when the guides are attached thereto. A flat adjustment plate 26 (FIG. 4) is inserted into the space between the offset portion of retaining guide 22 and flat surface member 18. The adjustment plate 26 is of a width sufficient to materially restrict the width of the discharge orifice 20 when the plate is slid upwardly across it. In this manner, the width of the discharge aperture may be varied.

A pair of hood or canopy-type adjusting plates or dampers 28 are inserted in the space between the offset portion of retaining guide 24 and surface member 19. The canopy adjusting plates 28 in cross section include a double offset portion, which permits these members to seat over the lip 40 and extend entirely across the discharge aperture 20. The free end of the adjusting plates 28 have a leg which rests upon the flat adjusting plate 26 on the other side of the aperture 20. The pair of hoods 28 are used and are aligned in tandem, so that they may be slidably separated or closed together to adjust the effective length of the discharge aperture 20.

With the cover 12 of the sealing device 4 removed, the interior of the device is revealed as in FIG. 3. The interior of the device is basically a hollow compartment which preferably includes an insulating lining 30 of a commercially available substance such as "Transite" (an asbestos fiber and cement binder composition). This lining extends around all four sides of the device and also across its bottom surface.

A heating element 32, or a pair of the same, is positioned within the hollow interior compartment of the device, and is connected to the inlet 16. In the embodiment illustrated, the heating element is a loop. The heating element 32 is preferably an electrical unit having a rigidly encased, high wattage resistance element such as is sold under the name "Calrod." In this embodiment, the inlet 16 is, of course, the terminal by which the heating element is connected to a supply of electrical power. The heating element 32 is preferably held in position within the interior of the device 4 by means of mounts such as 34, which are formed from a material (such as "Transite") which will insulate the element 32 from the sides and bottom of the device.

As indicated previously, an inlet 14 in one end 10 of the sealing device introduces a supply of compressed air into the interior thereof. The compressed air is fed through a distribution conduit such as 36 (FIG. 4), which is generally coextensive with the elongated heating element 32. It is located above the heating element and midway between the legs of the loop. A series of distribution orifices 38 is formed along the conduit 36. These orifices are positioned to discharge the air downwardly at an angle so that it is directed at the legs of the heating element loop. The orifices 38 are small and so spaced that the air is discharged uniformly along the length of the sealing device and in such quantities that it may be quickly heated to the desired temperature. The compressed air is discharged from these orifices directly upon and all about the heating elements 32, and thence into the interior of the sealing device 4.

Figure 6:
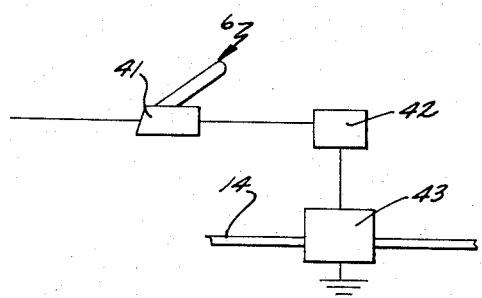
FIG. 6 is a schematic diagram of a control mechanism for the invention.

As shown schematically in FIG. 6, the sensing means 6 is connected to a normally open switch 41 through which power is supplied to a timer 42 and a solenoid operated, normally closed, air valve 43 in the air supply inlet 14 for the conduit 36. Triggering of the sensing means 6 immediately actuates the solenoid valve 43. After the lapse of a sufficient interval such as a half-second, the timer opens the circuit, thus closing the solenoid valve. This will occur irrespective of the fact that the package is still holding the sensing means 6. When the package releases the sensing means 6, the opening of the switch 41 will reset the timer 42 for the next package. In this way, the area of the package subjected to the hot jet is limited to the area to be sealed. It will be recognized that many other conventional control arrangements could be used with this invention. For example, the sensing means could be a photoelectric eye sensitive to a beam interrupted by the package. Also, the electronics could be eliminated by having the sensing means directly actuate a combination air valve and timer.

Figure 5:
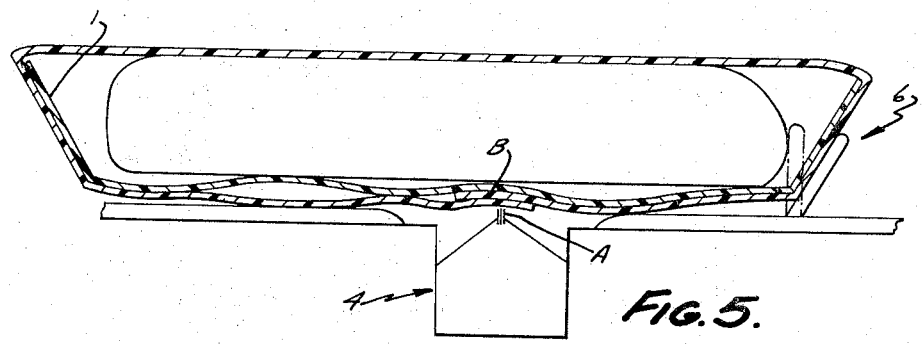
FIG. 5 is a central section of an illustrative package, the wrapping of which is being sealed by the sealing device, which is shown only schematically.

Having completely described the structure of the sealing device, its method of operation is as follows. Fragile or crushable consumer goods are placed in packages or trays 1 (FIG. 1) and these are wrapped with any of several thin plastic films having fusible properties, all in a known manner. The wrapped, but yet unsealed, package is moved in an automated manner, as by a conveyor mechanism 2, until it passes directly over the sealing device 4. The material wrapped about the package or tray is arranged so that its edges are overlapped on the bottom of the tray 1. At the instant when this area of overlapping is aligned over the discharge aperture 20 of sealing device 4 (FIG. 5), the sensing means 6 is actuated, preferably by the package itself as it moves along the conveyor mechanism. Actuation of the sensing means 6 causes pressurized air to be discharged from the distribution conduit 36 upon the heating element 32. This surge of pressurized air causes a jet "A" (FIG. 5) of hot air to be discharged upwardly through the orifice 20 of the sealing device 4. The jet impinges upon the overlapped layers "B" of wrapping film then in alignment with the sealing device, forcing them snugly together and against the bottom of the tray or package 1, and simultaneously heating the film sufficiently to cause its layers to fuse together into an airtight and moistureproof seal. A timer 42 (FIG. 6) controls the operation of solenoid actuated air valve 43, so that the jet of hot sealing air ceases after a predetermined interval calculated to produce the desired seal. The conveyor 2 continues to move the package. When the package has been moved past the sealing device, the sensing means 6 is released and returns to its normal position. The equipment is then ready for the arrival of another package.

The jet of hot, pressurized, sealing air is generated when the sensing means 6 is actuated to release a charge of compressed air from the distribution conduit 36 within the interior of the device 4 (see FIG. 4). The compressed air leaves the conduit 36 by means of a series of distribution orifices 38 formed therein, and flows directly onto heating elements 32, which are maintained at a predetermined temperature. The charge of compressed air is instantly heated as it enters the interior of the device, and since the interior is well insulated by the lining 30, the air loses little or no heat.

The cover structure 12 of the device 4, by means of its adjusting plates 26 and 28, provides a discharge aperture or orifice 20 adapted to the size of the package. Since there is no other escape for this air, it is still under pressure when it discharges through the aperture, which in effect, constitutes an outlet nozzle. Thus, the jet of air which leaves the sealing device is in the form of a hot, pressurized blast, whose shape and size are determined by the adjustment of the cover 12, which also serves to direct the charge of sealing air against only the desired area on the package 1.

Thus, regardless of the particular shape of package being wrapped and sealed, the top structure 12 by its adjusting plates 26 and 28 will provide a discharge aperture 20 which conforms to the shape of the desired seal, and which directs the hot sealing air against the area to be sealed as the package is moved past the sealing device. Moreover, the force of this jet of air will make certain that each package is completely and properly sealed, without regard to irregularities in its bottom surface, since the jet will force the layers of wrapping film against almost any type of surface, and will seal the layers while they are in this position.

The temperature of the air and the short duration of its discharge against each package prevents the heat of the operation from adversely affecting either the package or its contents. As an example, with a wrapping of polyethylene film, the temperature of the air at discharge is about 300° F. With a "Cryovac" film, the air at discharge is about 400° F. For most applications, the duration of the air jet is about 0.5 second, with an air pressure of approximately 40 p.s.i.

Quite clearly then, the device and method of this invention have solved a problem of considerable vexation within the art of packaging. The spirit of the invention and the concept underlying the same transcend the exact structure of the preferred embodiment disclosed herein, and I, therefore, do not wish to limit myself merely to this preferred embodiment, but only as is expressly set forth in the appended claims.

I claim:

1. A device for sealing overlapped layers of heat-fusible package wrapping film when said overlap is positioned adjacent an irregular or generally rigid surface of said package, comprising: a jacket having an elongated internal chamber; a pipe extending lengthwise of said chamber, said pipe being connected to a source of pressurized gas; a heating element mounted in said chamber and extending lengthwise thereof; said pipe having a plurality of orifices arranged therealong for discharging air onto said heating element; said chamber having an elongated slit-like discharge orifice for said gas; means for aligning the overlap of said wrapping film with said orifice where the discharge of the heated, pressurized gas will press the overlapped layers of film together against said package surface and fuse them together into a seal.

2. The device described in claim 1 wherein there is provided control means for starting and stopping the discharge of gas into said chamber; a timer connected to said control means for shutting off the supply of air at the end of a predetermined interval in each cycle of operation.

3. The device described in claim 1 wherein said jacket includes adjustable means defining said chamber discharge orifice, such that the extent of such orifice may be varied to suit a particular application.

4. The device described in claim 3, wherein said adjustable means includes at least one slidably mounted cover element which is slidable along an axis parallel to the axis of said discharge orifice.

5. The device described in claim 4, wherein said adjustable means includes a pair of said cover elements, each movable toward and away from the other along said axis.

6. The device described in claim 4, wherein there is provided control means for starting and stopping the discharge of gas into said chamber; and a timer connected to said control means for shutting off the supply of air at the end of a predetermined interval in each cycle of operation.

7. The device described in claim 6, wherein said heating element is an electrical resistance element.

References Cited
UNITED STATES PATENTS

| | | | |
|---|---|---|---|
| 2,423,237 | 7/1947 | Haslacher | 53—373 X |
| 2,751,965 | 6/1956 | Miller | 53—76 |
| 3,084,489 | 4/1963 | Seefluth | 53—388 X |
| 3,248,843 | 5/1966 | Winters et al. | 53—388 X |

TRAVIS S. McGEHEE, *Primary Examiner.*